(12) United States Patent
Wu et al.

(10) Patent No.: US 12,455,380 B2
(45) Date of Patent: Oct. 28, 2025

(54) 3D SENSING SYSTEM

(71) Applicant: HIMAX TECHNOLOGIES LIMITED, Tainan (TW)

(72) Inventors: Min-Chian Wu, Tainan (TW); Pen-Hsin Chen, Tainan (TW); Ching-Wen Wang, Tainan (TW); Cheng-Che Tsai, Tainan (TW); Ting-Sheng Hsu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 864 days.

(21) Appl. No.: 17/723,388

(22) Filed: Apr. 18, 2022

(65) Prior Publication Data
US 2023/0333251 A1   Oct. 19, 2023

(51) Int. Cl.
*G01S 17/89* (2020.01)
*G01S 7/481* (2006.01)

(52) U.S. Cl.
CPC ............ *G01S 17/89* (2013.01); *G01S 7/4815* (2013.01)

(58) Field of Classification Search
CPC ................................ G01S 17/89; G01S 7/4815
See application file for complete search history.

(56) References Cited

U.S. PATENT DOCUMENTS

| | | | |
|---|---|---|---|
| 2010/0185411 A1* | 7/2010 | Pfeiffer | G08G 1/01 340/686.1 |
| 2020/0284883 A1* | 9/2020 | Ferreira | G01S 7/4815 |

OTHER PUBLICATIONS

"Office Action of Taiwan Counterpart Application", issued on Oct. 24, 2023, p. 1-p. 11.

* cited by examiner

*Primary Examiner* — Jamil Ahmed
(74) *Attorney, Agent, or Firm* — JCIPRNET (57) ABSTRACT

A 3D sensing system is provided. The 3D sensing system includes a first sensing device, a second sensing device and a controller. The first sensing device provides at least one first emitting light and receives a first sensing signal based on a first sensing timing. The second sensing device provides at least one second emitting light and receives a second sensing signal based on a second sensing timing. The controller adjusts at least one of the first sensing timing and the second sensing timing according to an interference result of the second sensing signal by the first sensing device.

17 Claims, 6 Drawing Sheets

3D SENSING SYSTEM

BACKGROUND

Technical Field

The disclosure generally relates to a sensing system, and more particularly to a 3D sensing system having high decoded rate.

Description of Related Art

With the popularization of 3D recognition applications, various 3D sensing technologies are flourishing. Light source-based sensing systems are, for example, a structured light technology and a time-of-flight (ToF) ranging technology. The structured light technology projects a projected image on an object to be measured, receives a reflection sensing signal, introduces a triangular geometric structure, and then obtains depth information of the object. The ToF ranging technology calculates a time difference or a phase difference between a projection light and the reflection sensing signal from the object and calculates the distance and geometry to the object according to the time difference or the phase difference. It is also widely used in the sensing applications of wide viewing angle, such as terrain recognition of robots and self-driving cars.

It is necessary to use a plurality of sensing devices for a 3D sensing system. However, the light sources emitted from the sensing devices to the object may be overlapped in an overlap area at the same time. The sensing devices receive reflection sensing signals from other modules in the overlap area. Therefore, the sensing devices receive error reflection sensing signals and misjudged the 3D result. Further, the 3D sensing system has a low confidence, which lead to low decoded rate.

SUMMARY

The disclosure is related to a 3D sensing system having high decoded rate.

An embodiment of the disclosure provides a 3D sensing system. The 3D sensing system includes a first sensing device, a second sensing device and a controller. The first sensing device provides at least one first emitting light and receives a first sensing signal based on a first sensing timing. The second sensing device provides at least one second emitting light and receives a second sensing signal based on a second sensing timing. The controller is coupled to the first sensing device and the second sensing device. The controller adjusts at least one of the first sensing timing and the second sensing timing according to an interference result of the second sensing signal by the first sensing device.

Based on the above, the 3D sensing system adjusts at least one of the first sensing timing and the second sensing timing according to the interference result of the second sensing signal by the first sensing device. The interference from the first sensing device is prevented. Therefore, the 3D sensing system has high decoded rate.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

The disclosure is described below by means of a plurality of embodiments. However, the disclosure is not limited to the illustrated embodiments. Further, the following embodiments may be adaptively combined, replaced or omitted under reasonable circumstances to meet different practical needs. Throughout the full context of the description and the claims, the word "couple" in the description and claims may refer to any direct or indirect connection. For instance, in the description and claims, if a first device is coupled to a second device, it means that the first device may be directly connected to the second device or may indirectly connected to the second device through another device or by another connection means. In addition, the word "signal" may refer to at least one current signal, voltage signal, electric charge signal, temperature signal, data signal or any one or more signals.

Figure 1:
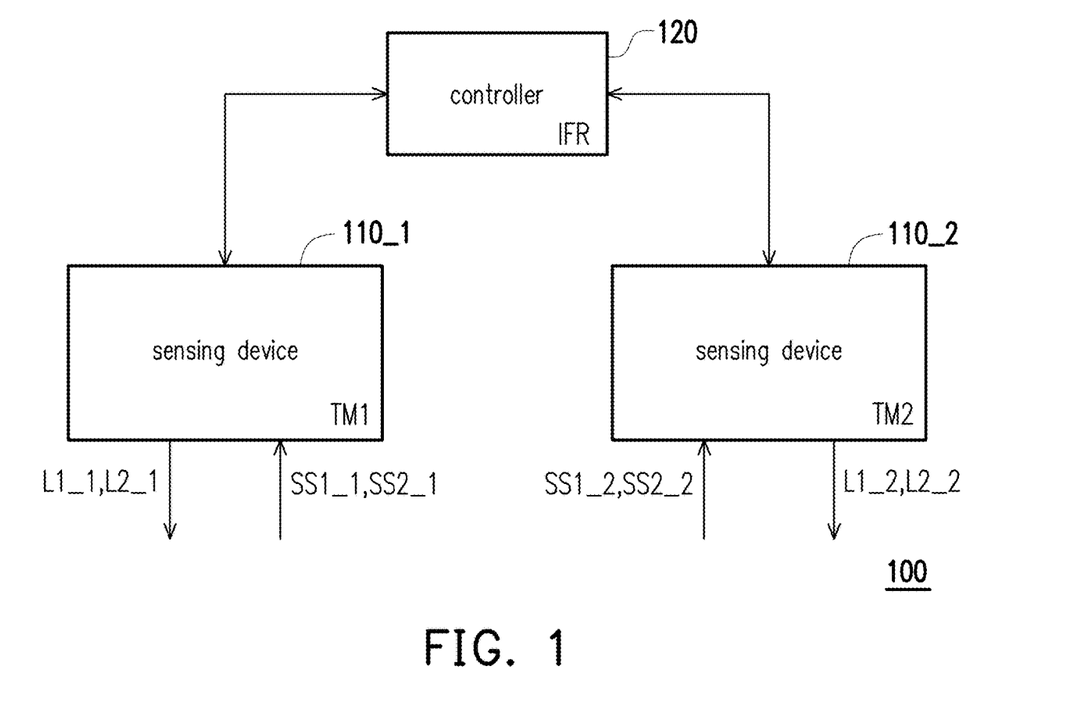
FIG. 1 illustrates a schematic diagram of a 3D sensing system according to an embodiment of the disclosure.

Referring to FIG. 1, FIG. 1 illustrates a schematic diagram of a 3D sensing system according to an embodiment of the disclosure. In the embodiment, the 3D sensing system 100 includes sensing devices 110_1, 110_2 and a controller 120. The sensing device 110_1 provides emitting lights L1_1 and L2_1 based on a sensing timing TM1. The sensing devices 110_1 receives sensing signals SS1_1 and SS2_1 based on the sensing timing TM1. Specifically, the sensing device 110_1 provides the emitting light L1_1 and receives the sensing signal SS1_1 in a first time interval. The sensing device 110_1 provides the emitting light L2_1 and receives the sensing signal SS2_1 in a second time interval. In other words, the sensing device 110_1 provides the emitting light L1_1 and receives the sensing signal SS1_1 at the same time interval. The sensing device 110_1 provides the emitting light L2_1 and receives the sensing signal SS2_1 at the same time interval. In the first time interval, the sensing device 110_1 projects the emitting light L1_1 to an object (not shown). The sensing signal SS1_1 is a reflection signal from the object.

The sensing device 110_1 performs a first recognition (for example, a 3D recognition computing) in response to the sensing signal SS1_1. In the second time interval, the sensing device 110_1 projects the emitting light L2_1 to the object. The sensing signal SS2_1 is a reflection signal from the object. The sensing device 110_1 performs a second recognition (for example, a 2D recognition computing) in response to the sensing signal SS2_1.

The sensing devices 110_2 provides emitting lights L1_2 and L2_2 based on a sensing timing TM2. The sensing devices 110_2 receives sensing signals SS1_2 and SS2_2 based on the sensing timing TM2. The sensing devices 110_2 provides the emitting lights L1_2 and receives the sensing signals SS1_2 in a third time interval. The sensing devices 110_2 provides the emitting light L2_2 and receives the sensing signal SS2_2 in a fourth time interval.

In the embodiment, the controller 120 is coupled to the sensing devices 110_1 and 110_2. The controller 120 adjusts at least one of the sensing timings TM1 and TM2 according to an interference result IFR of at least one of the sensing signals SS1_1, SS2_1, SS1_2 and SS2_2.

It should be noted, the controller 120 adjusts at least one of the sensing timings TM1 and TM2 according to the interference result IFR from the other sensing devices. The interference of the sensing devices 110_1 and 110_2 would be prevented. Therefore, the 3D sensing system has a high confidence and high decoded rate.

For example, the controller 120 receives the interference result IFR of the sensing signal SS1_2 from the sensing devices 110_2. When the interference result IFR indicates that the sensing signal SS1_2 is interfered by the sensing device 110_1, the controller 120 adjusts the sensing timing TM2 to not overlap with the sensing timings TM1. In other hand, when the interference result IFR indicates that the sensing signal SS1_2 is not interfered by the sensing device 110_1, the controller 120 does not adjust the sensing timing TM2.

In the embodiment, the controller 120 is located outside of the sensing devices 110_1 and 110_2. For example, the controller 120 is a host device in the 3D sensing system 100. In some embodiments, the controller 120 is located in one of the sensing devices 110_1 and 110_2. For example, the controller 120 is an embedded controller. In the embodiment, the controller 120 provided in the present embodiment may be, for example, a central processing unit (CPU), a programmable general-purpose or special-purpose microprocessor, a digital signal processor (DSP), a programmable controller, an application specific integrated circuit (ASIC), a programmable logic device (PLD), any other similar device, or a combination of said devices, and may be loaded to perform computer programs.

For convenience of description, a number of the sensing devices, a number of the emitting lights and a number of the sensing signals of this embodiment are respectively exemplified by 2, but the disclosure is not limited thereto. In some embodiments, the number of the sensing devices, the number of the emitting lights and the number of the sensing signals of this embodiment are respectively more than 2.

Figure 2:
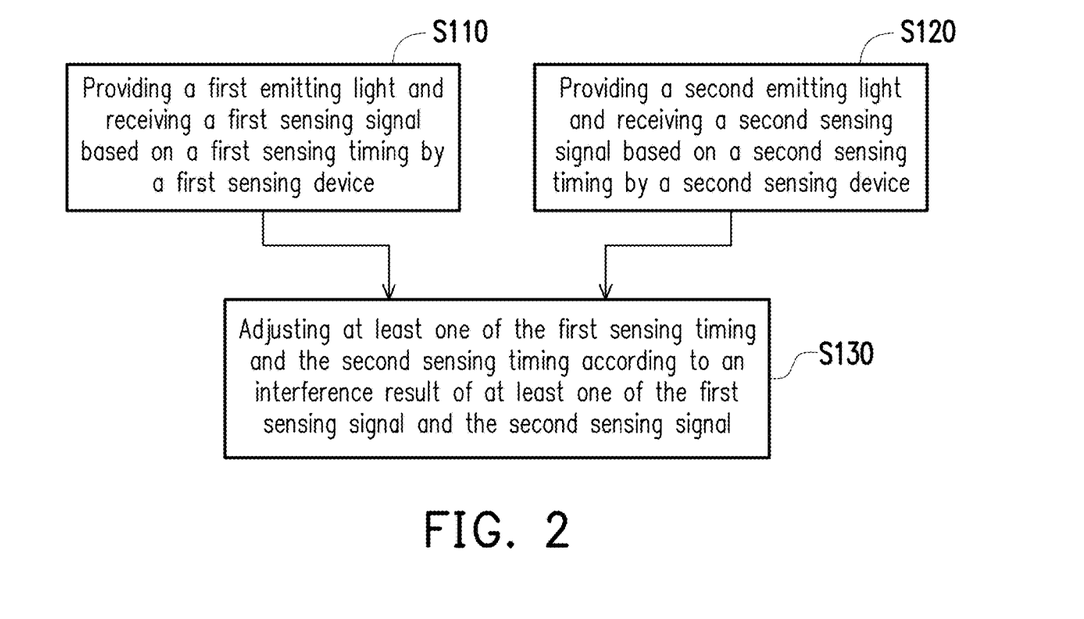
FIG. 2 illustrates a schematic diagram of 3D sensing method according to an embodiment of the disclosure.

Referring to FIG. 1 and FIG. 2, FIG. 2 illustrates a schematic diagram of 3D sensing method according to an embodiment of the disclosure. In the embodiment, the 3D sensing method is the 3D sensing system 100 is suitable for operating the 3D sensing system 100. In step S110, the embodiment, the sensing devices 110_1 provides the emitting lights L1_1 and L2_1 and receives the sensing signals SS1_1 and SS2_1 based on the sensing timing TM1. In step S120, the sensing devices 110_2 provides the emitting lights L1_2 and L2_2 and receives the sensing signals SS1_2 and SS2_2 based on the sensing timing TM2. In step S130, at least one of the sensing timings TM1 and TM2 are adjusted according to the interference result IFR of at least one of the sensing signals SS1_1, SS2_1, SS1_2 and SS2_2. The steps S110, S120 and S130 can be inferred by referring to the relevant description of FIG. 1, which is not repeated hereinafter.

Figure 3:
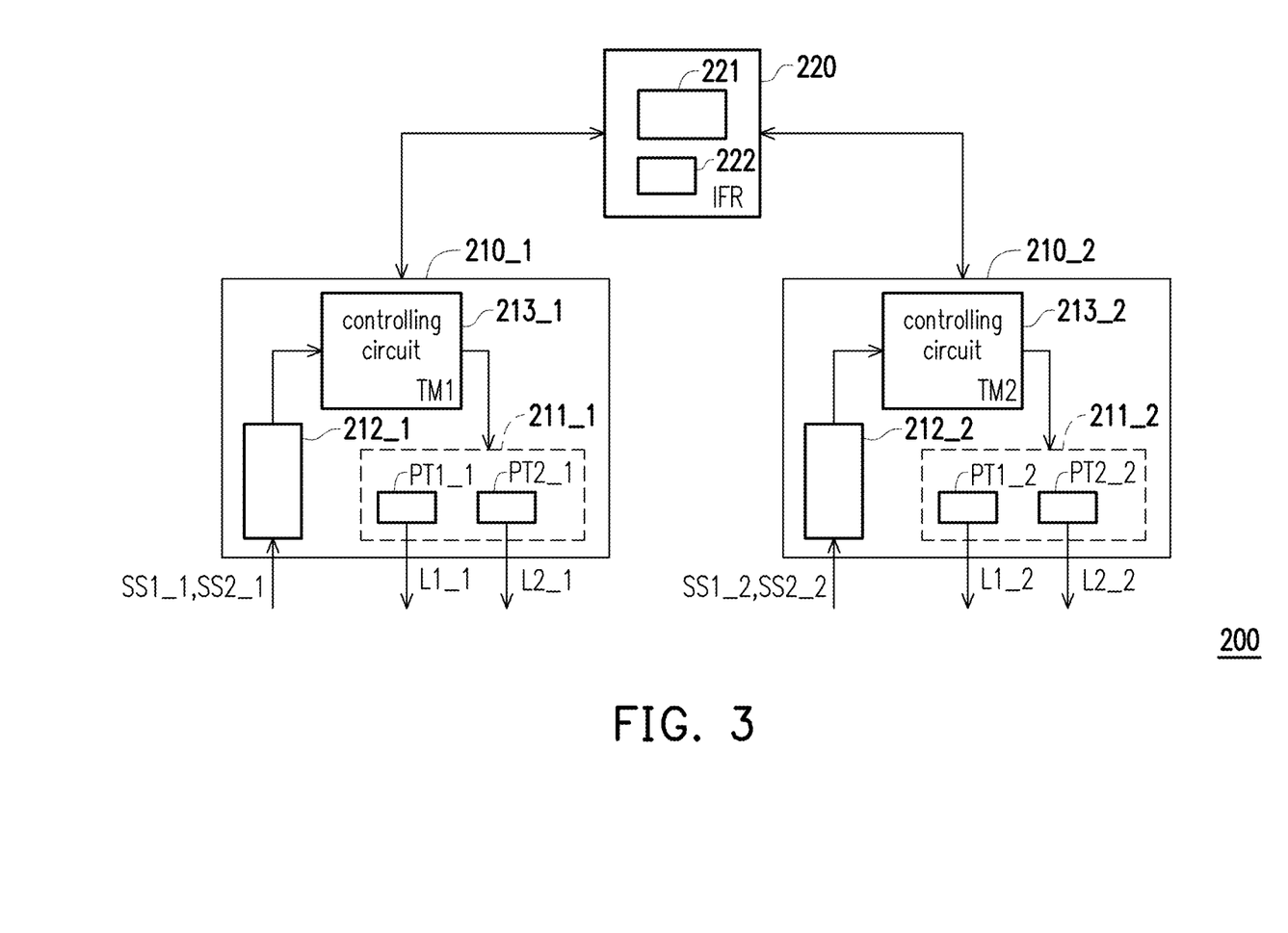
FIG. 3 illustrates a schematic diagram of a 3D sensing system according to another embodiment of the disclosure.

Referring to FIG. 3, FIG. 3 illustrates a schematic diagram of a 3D sensing system according to another embodiment of the disclosure. In the embodiment, the 3D sensing system 200 includes sensing devices 210_1, 210_2 and a controller 220. The sensing devices 210_1 includes a light source 211_1 and a sensor 212_1. The light source 211_1 provides the emitting lights L1_1 and L2_1. The sensor 212_1 receives the sensing signals SS1_1 and SS2_1. The sensing device 210_1 controls the light source 211_1 and the sensor 212_1 base on the sensing timing TM1. In the embodiment, the sensing devices 210_1 further includes a controlling circuit 213_1. The controlling circuit 213_1 controls the light source 211_1 and the sensor 212_1 base on the sensing timing TM1.

In the embodiment, the light source 211_1 includes at least one light emitting diode (LED) and/or at least one laser diode (LD). In the embodiment, the at least one LED may be implemented by at least one IR LED. The at least one LD may be implemented by at least one IR LD. In some embodiments, the at least one LED may be implemented by at least one visible light LED. The at least one LD may be implemented by at least one visible light LD. In the embodiment, each of the at least one LD is edge emitting laser (EEL) diode or vertical cavity surface emitting laser (VCSEL).

In the embodiment, types of the emitting light L1_1 and L2_1 includes at least one of a single light spot, a light spot array and a flood light. For example, the type of the emitting light L1_1 is a light spot array for a 3D computing. The type of the emitting light L2_1 is a flood light for a 2D computing.

In the embodiment, the light source 211_1 includes projectors PT1_1 and PT2_1. The controlling circuit 213_1 controls the projectors PT1_1 to project the emitting light L1_1 and controls the sensor 212_1 to receive the sensing signal SS1_1 in the first time interval. The controlling circuit 213_1 controls the projectors PT2_1 to project the emitting light L2_1 and controls the sensor 212_1 to receive the sensing signal SS2_1 in the second time interval. For example, the controlling circuit 213_1 performs the 3D computing based on the sensing signal SS1_1 and performs the 2D computing based on the sensing signal SS2_1.

The sensing devices 210_2 includes a light source 211_2 and a sensor 212_2. The light source 211_2 provides the emitting lights L1_2 and L2_2. The sensor 212_2 receives the sensing signals SS1_2 and SS2_2. The sensing device 210_2 controls the light source 211_2 and the sensor 212_2 base on the sensing timing TM2. In the embodiment, the sensing devices 210_2 further includes a controlling circuit 213_2. The controlling circuit 213_2 controls the light source 211_2 and the sensor 212_2 base on the sensing timing TM2.

In the embodiment, similar to the light source 211_1, the light source 211_2 includes at least one light emitting diode (LED) and/or at least one laser diode (LD). In the embodiment, types of the emitting light L1_2 and L2_2 includes at least one of a single light spot, a light spot array and a flood light. For example, the type of the emitting light L1_2 is a light spot array for the 3D computing. The type of the emitting light L2_2 is a flood light for the 2D computing.

In the embodiment, the light source 211_2 includes projectors PT1_2 and PT2_2. The controlling circuit 213_2 controls the projectors PT1_2 to project the emitting light L1_1 and controls the sensor 212_2 to receive the sensing signal SS1_2 in the third time interval. The controlling circuit 213_2 controls the projectors PT2_2 to project the emitting light L2_2 and controls the sensor 212_2 to receive the sensing signal SS2_2 in the fourth time interval. For example, the controlling circuit 213_2 performs the 3D computing based on the sensing signal SS1_2 and performs the 2D computing based on the sensing signal SS2_2.

In the embodiment, each of the controlling circuits 213_1 and 213_2 provided in the present embodiment may be, for example, a central processing unit (CPU), a programmable general-purpose or special-purpose microprocessor, a digital signal processor (DSP), a programmable controller, an application specific integrated circuit (ASIC), a programmable logic device (PLD), any other similar device, or a combination of said devices, and may be loaded to perform computer programs.

In the embodiment, the controller 220 includes a determining circuit 221 and a memory 222. The determining circuit 221 receives the interference result IFR of the sensing signals SS1_1, SS2_1, SS1_2 and SS2_2. The determining circuit 221 determines that the interference result IFR is interfered or not. For example, the determining circuits 221 determines that the interference result IFR of the sensing signal SS1_2 is interfered or not. When the determining circuits 221 determines that the sensing signal SS1_2 is interfered by the sensing device 210_1 according to the interference result IFR of the sensing signal SS1_2, the determining circuit 221 adjusts the sensing timing TM2 to not overlap with the sensing timing TM1 in an adjusting period.

In other hand, when the determining circuits 221 determines that the sensing signal SS1_2 is not interfered according to the interference result IFR of the sensing signal SS1_2, the determining circuit 221 does not adjust the sensing timing TM2. Besides, the determining circuit 221 stores the sensing timings TM1 and TM2 into the memory. When the sensing devices 210_1 and 210_2 are restarted, the determining circuit 221 controls the sensing device 210_1 based on the sensing timing TM1 stored in the memory 222 and controls the sensing device 210_2 based on the sensing timing TM2 stored in the memory 222.

Figure 4:
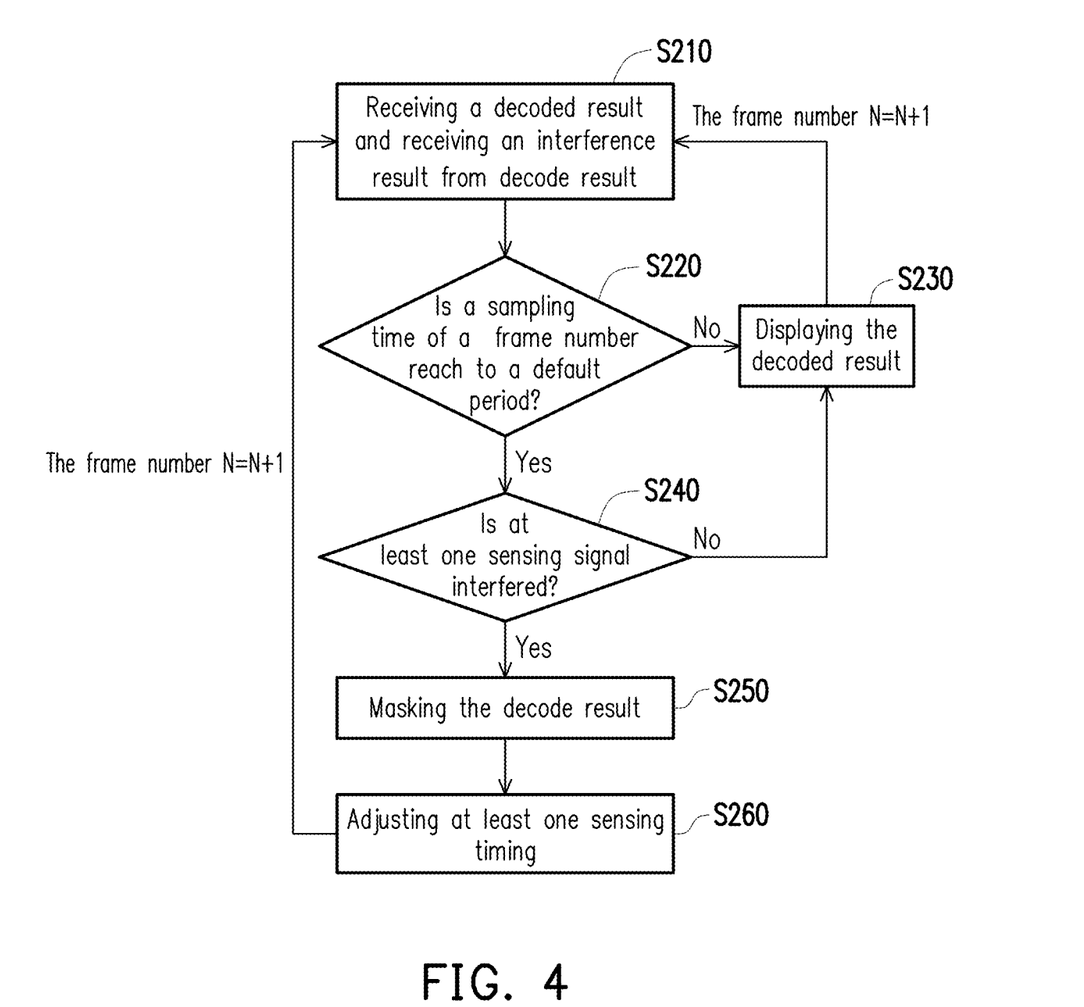
FIG. 4 illustrates a schematic diagram of a 3D sensing method according to another embodiment of the disclosure.

Referring to FIG. 1 and FIG. 4, FIG. 4 illustrates a schematic diagram of a 3D sensing method according to another embodiment of the disclosure. In the embodiment, the 3D sensing method is the 3D sensing system 100 is also suitable for operating the 3D sensing system 100. In step S210, the controller 120 receives a decoded result of at least one of the sensing signals SS1_1, SS2_1, SS1_2 and SS2_2 and receives the interference result IFR from the decoded result. In the embodiment, the decoded result is a 3D imaging result (or depth result, structure result) or a 2D imaging result. For example, the decoded result is a 3D imaging result from the sensing signal SS1_1 and a 3D imaging result from the sensing signal SS1_2, or a 2D imaging result from the sensing signal SS2_1 and a 2D imaging result from the sensing signal SS2_2. In the embodiment, the interference result IFR is at least one of a decoded rate of the 3D imaging result or the 2D imaging result.

In step S220, If the controller 120 determines that a sampling time of a frame number does not reach to the default period, the controller 120 displays (or outputs) the decoded result in step S230, controls sensing devices 110_1, 110_2 to receive the sensing signals SS1_1, SS2_1, SS1_2 and SS2_2 again (the frame number N=N+1), and then returns to the operation in step S210. In other hand, if the controller 120 determines that a sampling time of a frame number reaches to the default period, the controller 120 determines whether the interference result IFR indicates that at least one of the sensing signals SS1_1, SS2_1, SS1_2 and SS2_2 is interfered or not in step S240. In other words, the controller 120 determines the interference result IFR based on a default period. The default period includes at least one frame time.

In step S240, if the controller 120 determines that the sensing signals SS1_1, SS2_1, SS1_2 and SS2_2 are interfered, the controller 120 displays (or outputs) the decoded result in step S230, controls sensing devices 110_1, 110_2 to receive the sensing signals SS1_1, SS2_1, SS1_2 and SS2_2 again (the frame number N=N+1). In other hand, if the controller 120 determines that at least one of the sensing signals SS1_1, SS2_1, SS1_2 and SS2_2 is interfered, the controller 120 masking the decoded result in step S250, and adjusts at least one of the sensing timings TM1 and TM2 in step S260, and then returns to the operation in step S210.

In some embodiments, steps S220 and S250 may be option operations. In some embodiments, step S220 may be skipped. In some embodiments, step S250 may be skipped. In some embodiments, both steps S220 and S250 may be skipped.

Figure 5A:
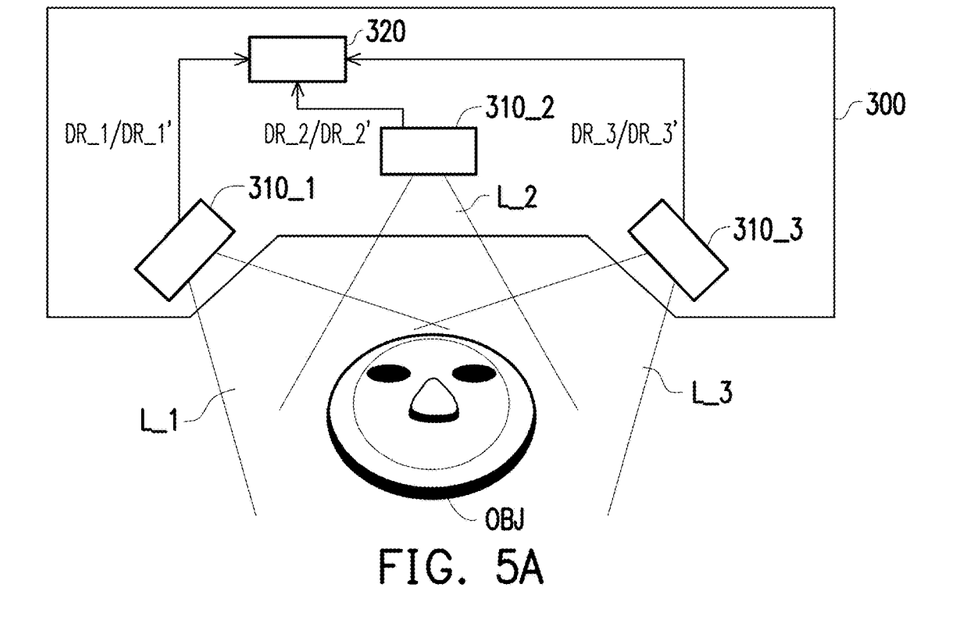
FIG. 5A illustrates a schematic diagram of a scenario of a 3D sensing system according to an embodiment of the disclosure.
Figure 5B:
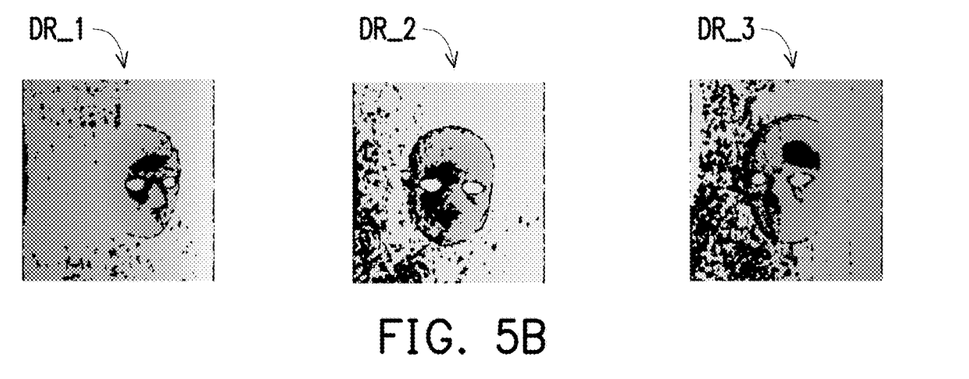
FIG. 5B illustrates a schematic diagram of decoded results having low decoded rate.

Referring to FIG. 4, FIG. 5A and FIG. 5B, FIG. 5A illustrates a schematic diagram of a scenario of a 3D sensing system according to an embodiment of the disclosure. FIG. 5B illustrates a schematic diagram of decoded results having low decoded rate. In the embodiment, the 3D sensing system 300 includes sensing devices 310_1, 310_2, 310_3 and a controller 320. The sensing device 310_1 provides an emitting light L_1 to an object OBJ, receives a sensing signal SS_1 from the object OBJ and generates a decoded result DR_1 according to the sensing signal SS_1. The sensing device 310_2 provides an emitting light L_2 to the object OBJ, receives a sensing signal SS_2 from the object OBJ and generates a decoded result DR_2 according to the sensing signal SS_2. The sensing device 310_3 provides an emitting light L_3 to the object OBJ, receives a sensing signal SS_3 from the object OBJ and generates a decoded result DR_3 according to the sensing signal SS_3.

The controller 320 receives decoded results DR_1, DR_2 and DR_3 and obtains a first interference result of the decoded result DR_1, a second interference result of the decoded result DR_2 and a third interference result of the decoded result DR_3. In the embodiment, the first interference result is a decoded rate of the decoded result DR_1. The second interference result is a decoded rate of the decoded result DR_2. The third interference result is a decoded rate of the decoded result DR_3.

In the embodiment, the controller 320 determines the decoded rates of the decoded results DR_1, DR_2 and DR_3. In the embodiment, the decoded rate of the decoded result DR_1 is associated with an area ratio of an identifiable region in the decoded result DR_1. The decoded rate of the decoded result DR_2 is associated with an area ratio of an identifiable region in the decoded result DR_2. The decoded rate of the decoded result DR_3 is associated with an area ratio of an identifiable region in the decoded result DR_3. In FIG. 5B, there are unidentifiable parts in the decoded results DR_1, DR2 and DR_3. The unidentifiable parts in the decoded results DR_1 may be generated by the interference from the emitting lights L_2 and L_3. The unidentifiable parts in the decoded results DR_2 may be generated by the interference from the emitting lights L_1 and L_3. The unidentifiable parts in the decoded results DR_3 may be generated by the interference from the emitting lights L_1 and L_2.

In FIG. 5B, the decoded rate of the decoded result DR_1 is 88.85%. The decoded rate of the decoded result DR_2 is 77.02%. The decoded rate of the decoded result DR_3 is 70.19%. For example, a threshold value is set as 85%. In step S240, the controller 320 determines that the decoded rates of the decoded results DR_2 and DR_3 are lower than the threshold value, it means that the sensing signal SS_2 may be interfered by at least one of the emitting lights L_1 and L_3 and the sensing signal SS_3 may be interfered by at least one of the emitting lights L_1 and L_2. Therefore, the controller 320 adjusts at least one of the sensing timings of the sensing devices 310_1, 310_2, 310_3 in step S250.

Figure 5C:
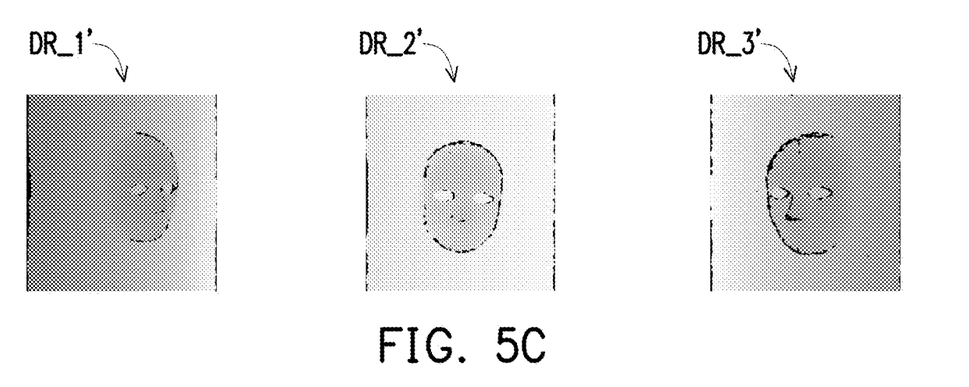
FIG. 5C illustrates a schematic diagram of decoded results having high decoded rate.

Referring to FIG. 4, FIG. 5A and FIG. 5C, FIG. 5C illustrates a schematic diagram of decoded results having high decoded rate. In FIG. 5C, the decoded rate of the decoded result DR_1' is 97.32%. The decoded rate of the decoded result DR_2' is 97.24%. The decoded rate of the decoded result DR_3' is 96.76%. For example, a threshold value is set as 90%. In step S240, the controller 320 determines that the decoded rates of the decoded results DR_1', DR_2' and DR_3' are higher than the threshold value, it means that the sensing signals SS_1, SS_2 and SS_3 are not interfered. Therefore, the controller 320 does not adjust the sensing timings of the sensing devices 310_1, 310_2, 310_3.

In some embodiments, the first interference result is a brightness of the decoded result DR_1'. The second interference result is a brightness of the decoded result DR_2'. The third interference result is a brightness of the decoded result DR_3'. In step S240, the controller 320 determines that the brightness of the decoded result DR_1', the brightness of the decoded result DR_2' and the brightness of the decoded result DR_3' are higher than a brightness threshold value or not. For example, if the brightness of the decoded result DR_2' is higher than the brightness threshold value, it means that the sensing signal SS_2 may be interfered by at least one of the emitting lights L_1 and L_3. Therefore, the controller 320 adjusts at least one of the sensing timings of the sensing devices 310_1, 310_2, 310_3 in step S250. In other hand, if the brightness of the decoded result DR_1', the brightness of the decoded result DR_2' and the brightness of the decoded result DR_3 are higher than the brightness threshold value, it means that the sensing signals SS_1, SS_2 and SS_3 are interfered. Therefore, the controller 320 does not adjust the sensing timings of the sensing devices 310_1, 310_2, 310_3.

In some embodiments, the first interference result is the decoded rate and the brightness of the imaging result from the sensing signal SS_1. The second interference result is the decoded rate and the brightness of the imaging result from the sensing signal SS_2. The third interference result is the decoded rate and the brightness of the imaging result from the sensing signal SS_3.

Figure 6A:
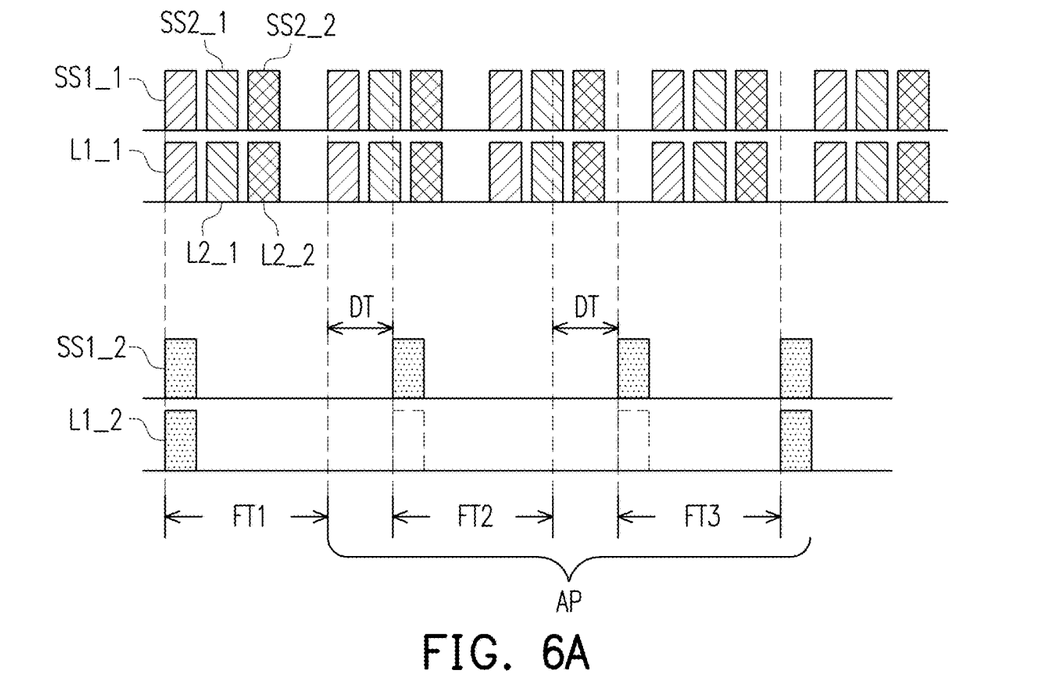
FIG. 6A illustrates a schematic diagram of adjusting operation according to a first embodiment of the disclosure.

Referring to FIG. 1 and FIG. 6A, FIG. 6A illustrates a schematic diagram of adjusting operation according to a first embodiment of the disclosure. FIG. 6A illustrates timings of the emitting lights L1_1, L2_1, L1_2, L2_2 and the sensing signals SS1_1, SS2_1, SS1_2, SS2_2. In the embodiment, the emitting light L1_1 is supplied based on a first sensing timing by the sensing device 110_1. The sensing signal SS1_1 is received based on the first sensing timing by the sensing device 110_1. The emitting light L2_1 is supplied based on a second sensing timing by the sensing device 110_1. The sensing signal SS2_1 is received based on the second sensing timing by the sensing device 110_1. The emitting light L1_2 is supplied based on a third sensing timing by the sensing device 110_2. The sensing signal SS1_2 is received based on the third sensing timing by the sensing device 110_2. The emitting light L2_2 is supplied based on a fourth sensing timing by the sensing device 110_2. The sensing signal SS2_2 is received based on the fourth sensing timing by the sensing device 110_2. The first sensing timing, the second sensing timing and the third sensing timing are not overlap form each other. However, the fourth sensing timing and the first sensing timing are overlap each other during a frame time FT1. When the interference result IFR of the sensing signal SS1_2 indicates that the sensing signal SS1_2 is interfered, it means that the sensing signal SS1_2 is interfered by the emitting light L1_1 as shown in FIG. 6A. Therefore, the controller 120 delays the fourth sensing timing based on a delay time length DT in the adjusting period AP.

In a frame time FT2 in the adjusting period AP, the controller 120 determines that the fourth sensing timing overlap the second sensing timing and the third sensing timing, it means that the sensing signal SS1_2 is interfered by the emitting lights L2_1 and L2_2. Therefore, the controller 120 delays the fourth sensing timing based on the delay time length DT again in the adjusting period AP. In a frame time FT3 in the adjusting period AP, the controller 120 determines that the fourth sensing timing does not overlap the other sensing timings, it means that the sensing signal SS1_2 is not interfered by the emitting lights L1_1, L2_1, L2_2. Therefore, the adjusting period AP is finished.

In some embodiments, in the adjusting period AP, the controller 120 may delays the first sensing timing based on the delay time length DT until the first sensing timing, the second sensing timing, the third sensing timing and the fourth sensing timing are not overlap form each other.

In the embodiments, the sensing device 110_2 receives the second sensing signal SS1_2 based on an adjusted sensing timing (delayed fourth sensing timing) and stops providing the emitting light L1_2 in the adjusting period AP. Therefore, a power consumption of the 3D sensing system 100 could be decreased in the adjusting period AP.

In some embodiments, the sensing device 110_2 receives the sensing signal SS1_2 based on an adjusted sensing timing and provides the emitting light L1_2.

Figure 6B:
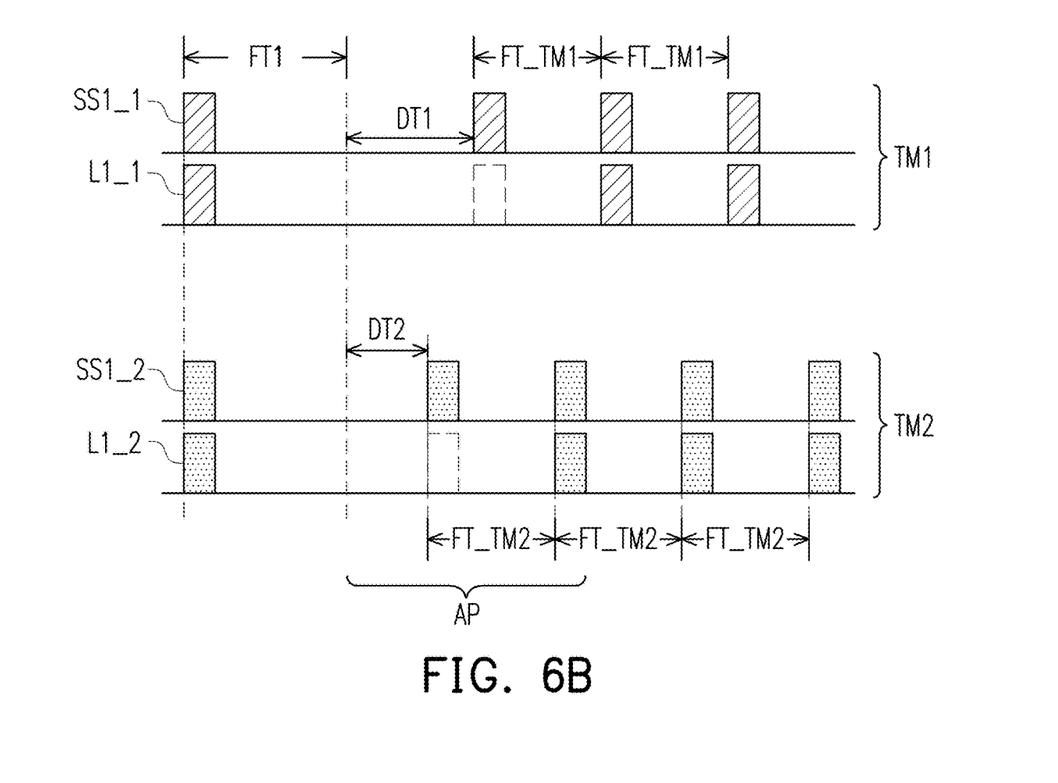
FIG. 6B illustrates a schematic diagram of adjusting operation according to a second embodiment of the disclosure.

Referring to FIG. 1 and FIG. 6B, FIG. 6B illustrates a schematic diagram of adjusting operation according to a second embodiment of the disclosure. In the embodiment, FIG. 6B illustrates timings of the emitting lights L1_1, L1_2 and the sensing signals SS_1, SS1_2. In the embodiment, the emitting light L1_1 is supplied based on the sensing timing TM1 by the sensing device 110_1. The sensing signal SS1_1 is received based on the sensing timing TM1 by the sensing device 110_1. The emitting light L1_2 is supplied based on the sensing timing TM2 by the sensing device 110_2. The sensing signal SS1_2 is received based on the sensing timing TM2 by the sensing device 110_2. The sensing timing TM1 and the sensing timing TM2 are overlap each other during the frame time FT1. When the interference result IFR of the sensing signal SS1_2 indicates that the sensing signal SS1_2 is interfered, it means that the sensing signal SS1_2 is interfered by the emitting light L1_1 as shown in FIG. 6B. Therefore, in the adjusting period AP, the controller 120 delays the sensing timing TM1 based on a delay time length DT1 and delays the sensing timing TM2 based on a delay time length DT2. The delay time length DT2 is different from the delay time length DT1 in the adjusting period AP. Therefore, the sensing timing TM1 and the sensing timing TM2 do not overlap the each other.

In the embodiments, the sensing device 110_1 receives the second sensing signal SS1_1 and stops providing the emitting light L1_1 in the adjusting period AP. the sensing device 110_2 receives the second sensing signal SS1_2 and stops providing the emitting light L1_2 in the adjusting period AP. Therefore, the power consumption of the 3D sensing system 100 could be decreased in the adjusting period AP.

In the embodiments, a frame time FT_TM1 of the sensing timing TM1 is set to substantially equal to the frame time FT1. A frame time FT_TM2 of the sensing timing TM2 is set to substantially equal to the frame time FT2.

In some embodiments, in the adjusting period AP, the controller 120 adjusts at least one of the frame time FT_TM1 and FT_TM2, so that the frame time FT_TM1 and the frame time FT_TM2 are different from each other.

Figure 6C:
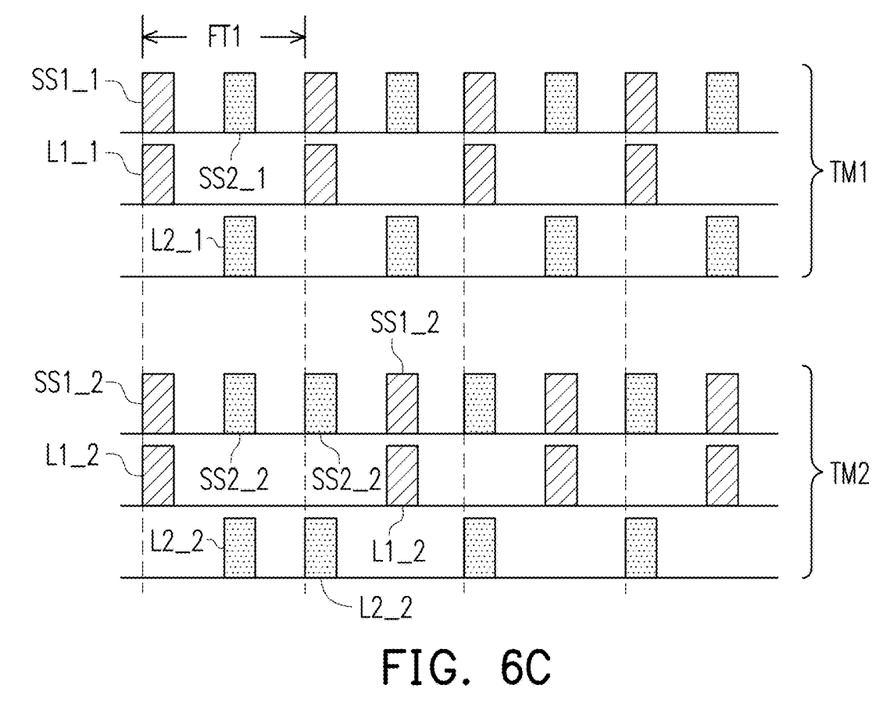
FIG. 6C illustrates a schematic diagram of adjusting operation according to a third embodiment of the disclosure.

Referring to FIG. 1 and FIG. 6C, FIG. 6C illustrates a schematic diagram of adjusting operation according to a third embodiment of the disclosure. FIG. 6C illustrates timings of the emitting lights L1_1, L2_1, L1_2, L2_2 and the sensing signals SS1_1, SS2_1, SS1_2, SS2_2. In the embodiment, the emitting light L1_1 is supplied based on the sensing timing TM1 by the sensing device 110_1. The sensing signal SS1_1 is received based on the sensing timing TM1 by the sensing device 110_1. The emitting light L2_1 is supplied based on the sensing timing TM1 by the sensing device 110_1. The sensing signal SS2_1 is received based on the sensing timing TM1 by the sensing device 110_1. The emitting light L1_2 is supplied based on the sensing timing TM2 by the sensing device 110_2. The sensing signal SS1_2 is received based on the sensing timing TM2 by the sensing device 110_2. The emitting light L2_2 is supplied based on the sensing timing TM2 by the sensing device 110_2. The sensing signal SS2_2 is received based on the sensing timing TM2 by the sensing device 110_2. In the embodiment, the sensing device 110_1 provides the emitting light L1_1 having a first type and the emitting light L2_2 having a second type. The sensing device 1102 provides the emitting light L1_2 having the first type and the emitting light L2_2 having the second type.

For example, the first type is a first wave length and the second type is a second wave length. The first wave length and the second wave length are different from each other. Therefore, in the embodiment, the sensing signal SS1_1 is not interfered by the emitting light L2_2 having the second type. The sensing signal SS2_1 is not interfered by the emitting light L1_2 having the first type.

In the embodiment, the sensing device 110_1 provides the emitting light L1_1 having a first type and the emitting light L2_1 having a second type in the first sequential order of the sensing timing TM1 during the frame time FT1. The sensing device 110_2 provides the emitting light L1_2 having the first type and the emitting light L2_2 having the second type in the first sequential order of the sensing timing TM2 during the frame time FT1. Besides, the sensing timings TM1 and TM2 are overlap each other during the frame time FT1. When the interference result IFR of at least one of the sensing signals SS1_1, SS2_1, SS1_2, SS2_2 indicates that at least one of the sensing signal SS1_1, SS2_1, SS1_2, SS2_2 is interfered, the controller 120 changes the first sequential order of one of the sensing timings TM1 and TM2 to a second sequential order in the adjusting period AP.

For example, when the interference result IFR of at least one of the sensing signal SS1_2 indicates that the sensing signal SS1_2 is interfered, it means that the sensing signal SS1_2 is interfered by the emitting light L1_1 having the first type. Therefore, the controller 120 reverses the first sequential order of the sensing timing TM2 to a second sequential order in the adjusting period AP. The second sequential order is opposite to the first sequential order. The sensing device 110_1 provides the emitting lights L1_1 and L2_1 having a second type in the first sequential order after the adjusting period AP finished. The sensing device 110_2 provides the emitting lights L1_2 and L2_2 in the second sequential order after the adjusting period AP finished.

Figure 6D:
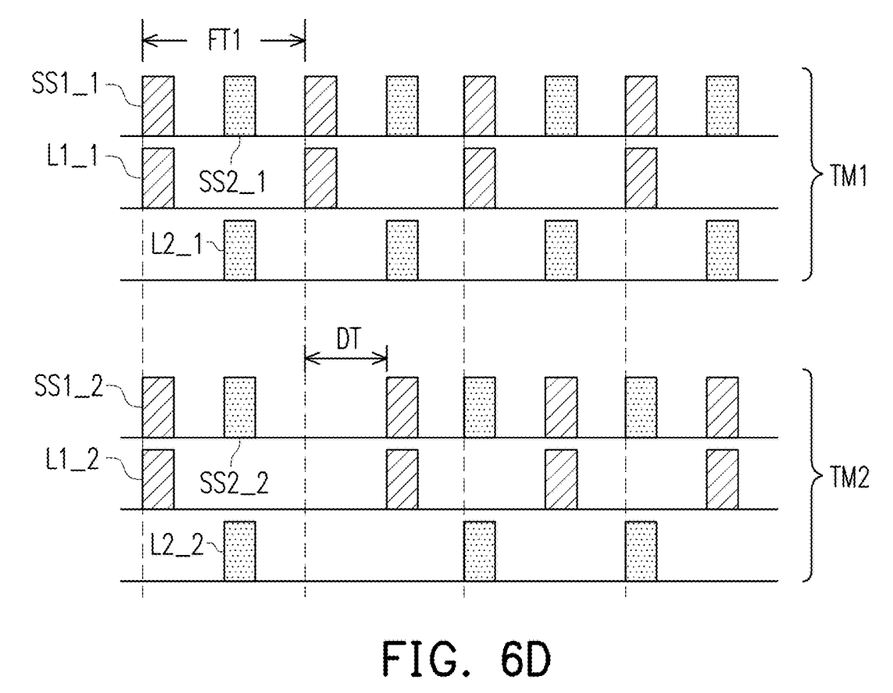
FIG. 6D illustrates a schematic diagram of adjusting operation according to a fourth embodiment of the disclosure.

Referring to FIG. 1 and FIG. 6D, FIG. 6D illustrates a schematic diagram of adjusting operation according to a fourth embodiment of the disclosure. FIG. 6D illustrates timings of the emitting lights L1_1, L2_1, L1_2, L2_2 and the sensing signals SS1_1, SS2_1, SS1_2, SS2_2. In the embodiment, the sensing device 110_1 provides the emitting light L1_1 having the first type and the emitting light L2_2 having the second type. The sensing device 110_2 provides the emitting light L1_2 having the first type and the emitting light L2_2 having the second type. The emitting lights L1_1, L2_1, L1_2, L2_2 and the sensing signals SS1_1, SS2_1, SS1_2, SS2_2, the first type and the second type of the embodiment can be inferred by referring to the relevant description of FIG. 1 and FIG. 6C, which is not repeated hereinafter.

During the frame time FT1, when the interference result IFR of at least one of the sensing signals SS1_1, SS2_1, SS1_2, SS2_2 indicates that at least one of the sensing signal SS1_1, SS2_1, SS1_2, SS2_2 is interfered, the controller 120 delays one of the sensing timings TM1 and TM2. For example, when the interference result IFR of at least one of the sensing signal SS1_2 indicates that the sensing signal SS1_2 is interfered, it means that the sensing signal SS1_2 is interfered by the emitting light L1_1 having the first type. Therefore, the controller 120 delays the sensing timing TM2 based on the delay time length DT. For example, the delay time length DT is substantially equal to a time difference between a time point of providing the emitting light L1_1 and a time point of providing the emitting light L2_1.

In view of the foregoing, the 3D sensing system adjusts at least one of the first sensing timing and the second sensing timing according to the interference result. The interference from the emitting light is prevented. Therefore, the 3D sensing system have high decoded rate.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A 3D sensing system, comprising:
a first sensing device, comprising a first light source configurated to provide at least one first emitting light and a first sensor configurated to receive a first sensing signal based on a first sensing timing;
a second sensing device, comprising a second light source configurated to provide at least one first emitting light and a second sensor configured to receive a second sensing signal based on a second sensing timing, wherein each of the first light source and the second light source comprises at least one light emitting diode or at least one laser diode; and a controller, coupled to the first sensing device and the second sensing device, configured to receive the second sensing signal and adjust at least one of the first sensing timing and the second sensing timing according to an interference result of the second sensing signal by the first sensing device, wherein when the interference result indicates that the second sensing signal is interfered by the first sensing device, the controller is configured to adjust the second sensing timing to not overlap with the first sensing timing in an adjusting period, wherein in the adjusting period, the controller is configured to delay the first sensing timing based on a first delay time length and delay the second sensing timing based on a second delay time length different from the first delay time length.

2. The 3D sensing system of claim 1, wherein the second sensing device controls the light source and the sensor base on the second sensing timing.

3. The 3D sensing system of claim 1, wherein types of the at least one second emitting light comprises at least one of a single light spot, a light spot array and a flood light.

4. The 3D sensing system of claim 1, wherein the interference result of the second sensing signal is at least one of a decoded rate of an imaging result from the second sensing signal and a brightness of the imaging result from the second sensing signal.

5. The 3D sensing system of claim 1, wherein the controller determines the interference result based on a default period.

6. The 3D sensing system of claim 5, wherein the default period comprises at least one frame time.

7. The 3D sensing system of claim 1, wherein in the adjusting period, the second sensing device receives the second sensing signal based on an adjusted second sensing timing and stops providing the at least one second emitting light.

8. The 3D sensing system of claim 1, wherein in the adjusting period, the second sensing device receives the second sensing signal based on an adjusted second sensing timing and provides the at least one second emitting light.

9. The 3D sensing system of claim 1, wherein in the adjusting period, the controller delays the second sensing timing so as not to overlap with the first sensing time.

10. The 3D sensing system of claim 1, wherein in the adjusting period, the controller delays the first sensing timing so as not to overlap with the second sensing time.

11. The 3D sensing system of claim 1, wherein in the adjusting period, the controller adjusts at least one of a first frame time of the first sensing timing and a second frame time of the second sensing timing, so that the second frame time is different from the first frame time.

12. The 3D sensing system of claim 1, wherein the second sensing device provides a second emitting light having a first type and a second emitting light having a second type in a first sequential order, wherein when the interference result indicates that the second sensing signal is interfered by the first sensing device, the controller changes the first sequential order to a second sequential order in the adjusting period.

13. The 3D sensing system of claim 12, wherein the first type is a light spot array for a 3D computing, and the second type is a flood light for a 2D computing.

14. The 3D sensing method of claim 1, wherein when the interference result indicates that the second sensing signal is interfered by the first sensing device, the controller masks the second sensing signal.

15. The 3D sensing system of claim 1, wherein the controller is located in the second sensing device.

16. The 3D sensing system of claim 1, wherein the controller comprises:

a memory, when the interference result indicates that the second sensing signal is not interfered, the controller stores the first sensing timing and the second sensing timing into the memory.

17. The 3D sensing system of claim 16, wherein when the first sensing device and the second sensing device are restarted, the controller controls the first sensing device based on the first sensing timing stored in the memory and controls the second sensing device based on the second sensing timing stored in the memory.

* * * * *